D. O. FOSGATE.
Sulky-Plow.
No. 207,650.  Patented Sept. 3, 1878.
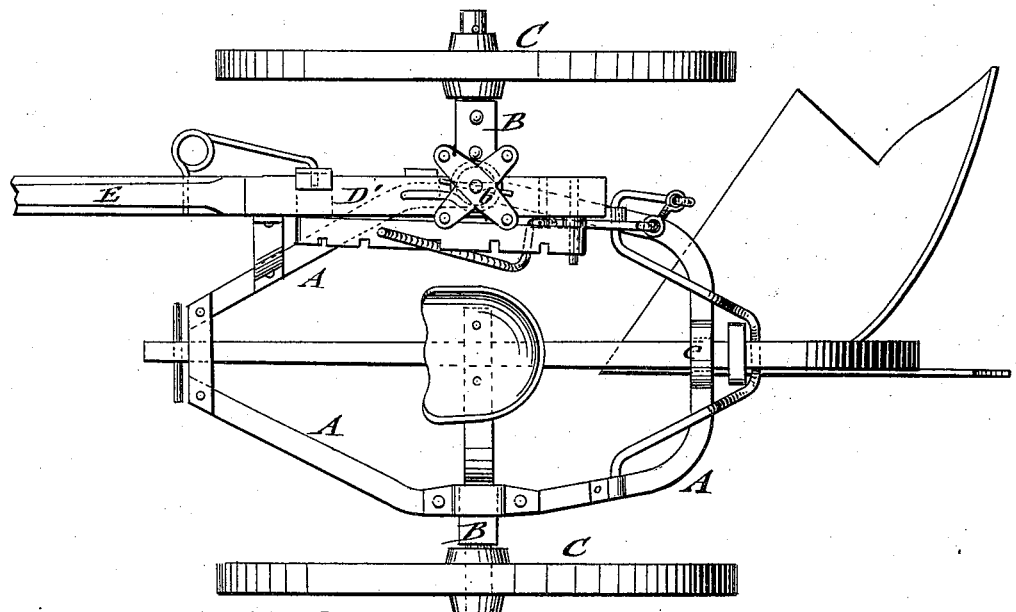
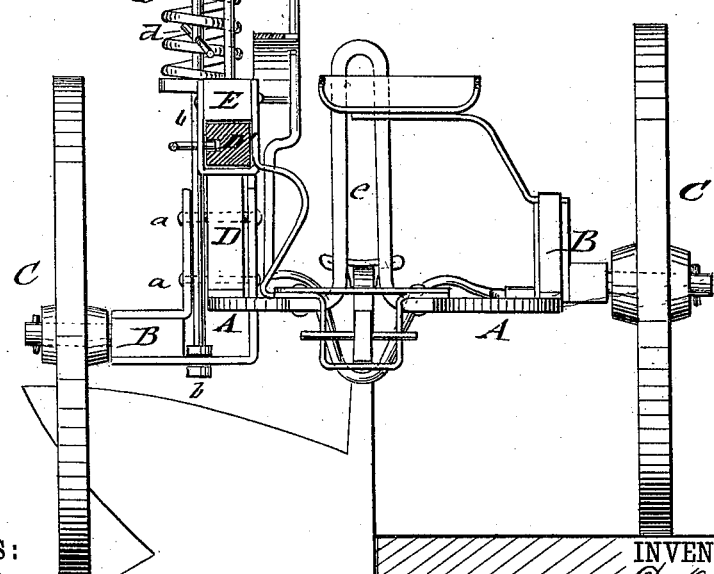
WITNESSES:
Chas. Nida
J. H. Scarborough
INVENTOR:
D. O. Fosgate
BY Munn & Co
ATTORNEYS.

UNITED STATES PATENT OFFICE.

DANIEL O. FOSGATE, OF RED WING, MINNESOTA.

IMPROVEMENT IN SULKY-PLOWS.

Specification forming part of Letters Patent No. 207,650, dated September 3, 1878; application filed November 26, 1877.

*To all whom it may concern:*

Be it known that I, DANIEL O. FOSGATE, of Red Wing, in the county of Goodhue and State of Minnesota, have invented a new and Improved Sulky-Plow, of which the following is a specification:

In the accompanying drawing, Figure 1 represents a plan view of my improved sulky-plow, and Fig. 2 a front elevation of the same.

Similar letters of reference indicate corresponding parts.

The object of this invention is to furnish an improved sulky-plow of light but durable construction, that may be easily controlled and operated by the driver and the plow-frame leveled without stopping the team; and the invention consists of a plow frame that is supported on angular axles, and capable of adjustment for being leveled by means of a sliding and slotted axle and suitable mechanism operated from the driver's seat. The plow-frame is made with a bend at the rear part for holding the plow firm and steady at any height.

Referring to the drawing, A represents the frame of the plow, which is supported on angular axles B and wheels C of equal height.

The axles B are preferably made of cast-iron and firmly bolted to frame A. One of the angular axles—preferably that to the right of the driver's seat—is made recessed in its vertical part and extended upward to be guided along a vertical standard, D, of the tongue-support D'. The vertical axle portion is furthermore slotted, and by the slots guided along headed pins *a* of the standard D.

The raising or lowering of the recessed axle B and its wheel C is produced by a vertical rod, *b*, that is secured to the recessed axle and operated by a hand-wheel at the upper end and by a diametrical cross-pin, *d*, passing along the convolutions of a spiral guide, *d'*, or by a worm-gear or other equivalent device. When, therefore, the wheel runs in a furrow, the frame A of the plow may be readily leveled by the driver by turning the rod *b* and lowering the wheel, the latter being raised again when level ground is reached by turning the rod in opposite direction.

The plow-frame A is made with a vertical center loop or bend, *e*, at the rear part, for holding the plow steadily and firmly at any height or depth, the plow-beam passing through the bend to a suitable support at the front part of frame A.

The plow is raised or lowered by any suitable lever arrangement, operated by the driver, and thrown in or out of work, as required, without stopping the team. The crank-axle hitherto used in sulky-plows for setting the plow is by this arrangement dispensed with.

The tongue E is attached by iron stirrups to the tongue-support D', and prevented from slipping out by means of a spring-key or other locking device.

The plow is designed for three horses abreast, the draft coming directly from end of plow-beam.

The sulky-plow is easily operated by leveling the frame and setting the plow, and of simple and reliable construction.

Having thus described my invention, I claim as new and desire to secure by Letters Patent—

1. The combination of frame A, axles B, standard D, tongue-support D', and tongue E in a sulky-plow, as shown and described.

2. The frame A, having the central bend *e*, in combination with the plow-beam passing through said bend and supported at the front of frame, substantially as shown and described.

DANIEL OSCAR FOSGATE.

Witnesses:
 FRANKLIN S. FIELD,
 CHRIS. GRAHAM.